United States Patent [19]
Johnson

[11] 3,836,952
[45] Sept. 17, 1974

[54] METHOD AND APPARATUS FOR RAPID SUBSURFACE EXPLORATION

[75] Inventor: Ronald F. Johnson, Eatontown, N.J.

[73] Assignee: The United States of America as represented by the Secretary of the Army, Washington, D.C.

[22] Filed: Mar. 3, 1972

[21] Appl. No.: 231,760

[52] U.S. Cl. ..... 340/15.5 CP, 73/67.7, 181/0.5 VM, 324/3, 340/15.5 TA
[51] Int. Cl. ............................................... G01v 1/00
[58] Field of Search ............ 340/15.5 TA, 15.5 CP; 181/.5 VM; 324/3, 6; 343/12 R; 73/67.6, 67.7

[56] References Cited
UNITED STATES PATENTS

| | | | |
|---|---|---|---|
| 3,155,972 | 11/1964 | Boyer | 343/12 R |
| 3,288,243 | 11/1966 | Silverman | 340/15.5 TA |
| 3,301,345 | 1/1967 | Carder | 181/.5 VM |
| 3,302,453 | 2/1967 | Wood et al. | 73/67.7 |
| 3,375,896 | 4/1968 | Beddo | 340/15.5 TA |

*Primary Examiner*—Maynard R. Wilbur
*Assistant Examiner*—H. A. Birmiel
*Attorney, Agent, or Firm*—Edward J. Kelly; Herbert Berl; Arthur L. Bowers

[57] ABSTRACT

Exploring a selected zone of the earth to a shallow depth for a tunnel excavation, hollow, or other anomaly, without digging, which includes the use of a transmitter electro-seismic transducer and at least one receiver electro-seismic transducer for causing seismic energy to transmit from transmitter transducer to receiver transducer, through the ground in the selected zone, and examining for any unusual deviation in the phase angle difference between energy at the emitting transducer and energy at the receiving transducer as the span between transducers is displaced or as the span length is changed.

4 Claims, 6 Drawing Figures

PATENTED SEP 17 1974    3,836,952

METHOD AND APPARATUS FOR RAPID SUBSURFACE EXPLORATION

This invention concerns the novel use of electro-seismic transducers of the type described and discussed in U.S. Pat. Nos. 3,268,029; 3,296,589; 3,302,746; 3,302,745, and in an article entitled "Communicating by Seismic Waves" in the magazine "Electronics" of Apr. 12, 1963, pages 51–55, and referenced in at least one of the patents, for more efficiently and more easily scanning a selected zone of exploration for a subsurface tunnel. Electro-seismic transducers of the type disclosed in the above-cited prior art have a beam pattern that includes one conical beam on the order of 60°, and an omnidirectional surface beam that penetrates to a shallow depth, which depth is a function of the medium and which propagates for a much shorter distance than the conical beam.

BACKGROUND OF THE INVENTION

Non-digging methods of probing for subsurface discontinuities include using an array of geophone receivers distributed among selected locations for detecting seismic energy propagated to those locations from the site of an explosive charge. Thumpers and electro-seismic transducers of the type referred to have been used as seismic energy sources. A probing method that employs an explosive charge or a thumper penetrates to greater depth than is necessary for the purposes of this invention; additionally, the set-up time plus the data evaluation time required is too great for a quick and easy scanning method that does not call for precise definitive data. Using electroseismic transducers in the prior art probing methods involves many tedious and time consuming measurements to explore a selected zone.

SUMMARY OF THE INVENTION

An object of the invention is to provide a practical method for comparatively rapidly scanning a zone of interest to obtain information that indicates the presence and the location of a shallow subsurface tunnel or the absence of any such tunnel in the zone of interest.

This invention concerns the use of a transmitter and a receiver electro-seismic transducer of the type described in the above-cited prior art, both narrow-band, and tuned to essentially the same center frequency and used in combination with a phase angle metering device and a recorder for indicating variation in phase angle between the signal energy at the transmitter and the signal energy detected at the receiver, as a function of displacement of the span between the transducers or as a function of the span length between the transducers.

DESCRIPTION OF THE DRAWING

In FIG. 1, there is syown transmitter and receiver electro-seismic transducers 10 and 12 seated on the ground in a zone to be explored for a shallow depth tunnel or other subsurface hollow. The transmitter transducer 10 is fitted with structural framework 14 to provide a tow cable attachment 16 and to facilitate towing the transmitter 10 upright along the ground surface. Each of the transducers are constructed to have essentially the same-center frequency and to have a very narrow band characteristic. For example, both transducers may be designed for 80Hz and each should have a bandwidth less than 3Hz. A signal generator 18 and a power amplifier 20 with an output on the order of 10 watts energize the transmitter 10 at its center frequency. A phase metering means 22 is connected between a point in the energizing circuit for transmitter 10 and a point in the electrical output circuit of receiver 12. Though no components are shown in the output circuit, conventional amplifier, filter, and other components are included as required. The phase metering means 22 is coupled to a graphic recorder 24. A portable platform-mounted which 26 is coupled to the tow cable attachment 16 on the transmitter 10.

To practice the invention, the receiver 12 is seated on the ground in the zone to be explored and the transmitter is seated on the ground near the receiver and is positioned along a selected scan path relative to the receiver. The winch is located along the scan path at a sufficient distance from the transmitter to tow the transmitter over the selected scan path in the zone of exploration. With the recorder operating at a constant speed and the transmitter energized through trailing cables that are not shown, the transmitter is towed at a substantially constant rate to traverse the surface along the line of scan. When the scan is completed, the recorder is stopped and the transmitter is carried back to the vicinity of the receiver and is positioned along another selected scan path. The operation is repeated. Two or more intersecting scans are carried out to explore the zone adequately. If the receiver remains in the same position, the several scans are radial. However, more complete coverage is achieved with a scan pattern approximating a grid. For a grid pattern, the receiver is positioned prior to each scan.

Figure 1:
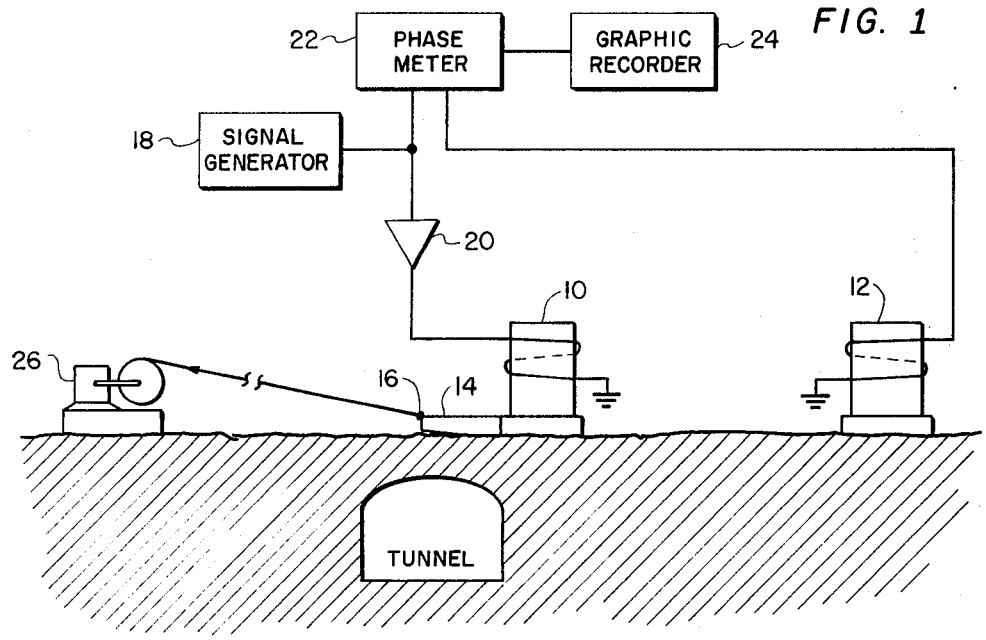
FIG. 1 is a diagrammatic showing of the basic components for one method of practicing the invention.
Figure 2:
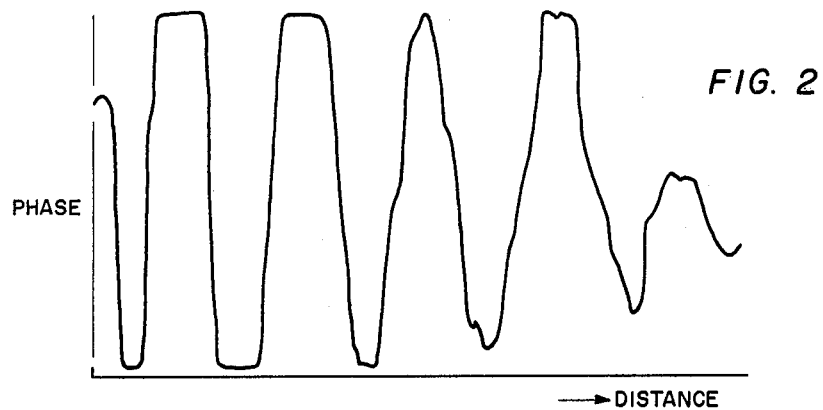
FIGS. 2, 3, and 4 are graphical plots of phase variation as a function of distance obtained in using the equipment of FIG. 1 in three different locations.

In FIG. 2, there is shown a phase curve obtained by carrying out the described procedure in a particular zone where the ground had not been perturbed by any underground construction, e.g., tunnels or pipelines. As expected, the curve approximated a sinusoid. If the earth in the zone were homogeneous, the curve would more closely approximate a sinusoid. Minor variances in FIG. 2 were caused by small discontinuities in the propagation path and/or changes in coupling of the transmitter transducer. It was found that a much stronger signal was received when a person sat on the transmitter transducer during a scan. This was attributed to better coupling of the seismic signal due to fuller compression of grass and weeds over which the transducer slid.

Figure 3:
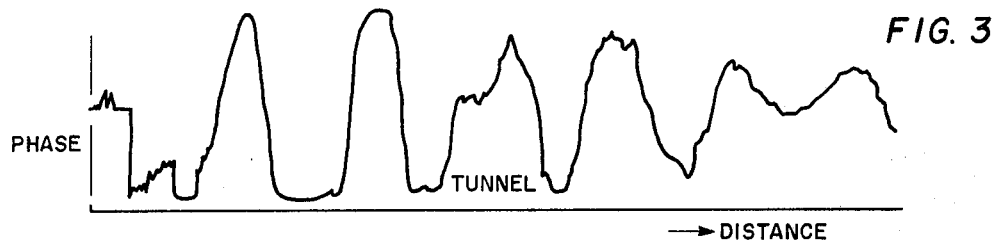

In FIG. 3, there is shown a phase curve obtained by carrying out the described procedure in a particular zone where there was a shallow-depth subsurface tunnel cased with a fiberglass tube and where the transmitter scan path crossed over the tunnel at about 90°. Similar results, not shown, were obtained at 45°. The previously described procedure was followed. The presence of the tunnel is indicated by that portion of the curve above the legend TUNNEL; at that portion of the curve, the phase is essentially constant over a distance corresponding to where the transmitter traverses the ground above the tunnel.

Figure 4:
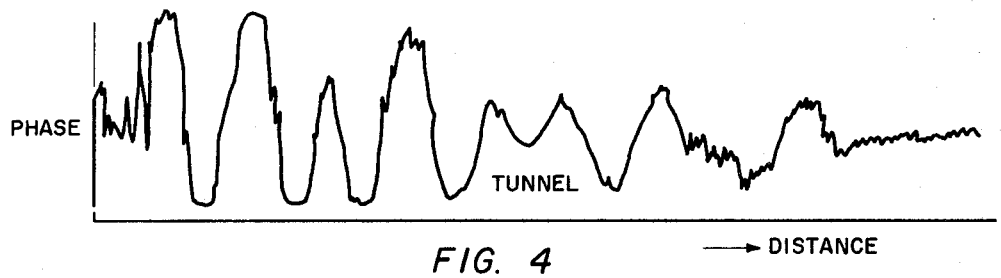

In FIG. 4, there is shown a phase curve obtained by carrying out the described procedure in a zone where there was a shallow depth self-supported tunnel. Sections of the self-supported tunnel had caved-in but data was taken over sections which appeared to have remained intact. The previously described procedure was followed. The presence of the tunnel is indicated by complete reversal of phase change above the legend TUNNEL. Greater effect was recorded for the uncased tunnel than for the cased tunnel, assumedly due to the larger volume of earth which had been disturbed by the collapse of portions of the uncased tunnel. A self-supporting tunnel which has not fallen in probably would register less effect than that indicated in the curve of FIG. 4.

When the receiver transducer is directly above a tunnel, the presence of the tunnel has no effect on signal energy arriving from a direction lateral to the tunnel because the tunnel then is in the null of the receiver beam pattern. Therefore to detect the tunnel, the receiver transducer must not be above the tunnel. For a thorough probe, either more than one receiver is used or the receiver must occupy at least two and preferably three positions that are not in line.

Figure 5:
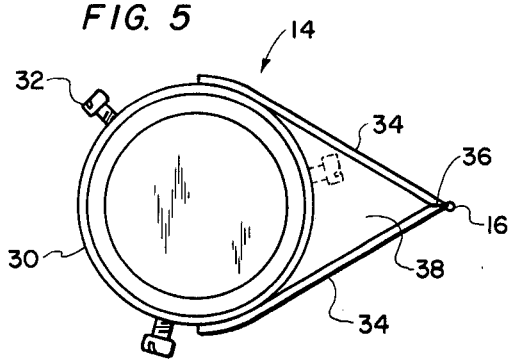
FIG. 5 is a plan view of a structural attachment for the base of an electro-seismic transducer to facilitate towing the transducer along the ground surface.

The structural framework 14 for providing a tow cable attachment is shown in FIG. 5. It includes a ring 30 which surrounds the base of the transmitter and is secured by several radial bolts 32 threadably engaging the ring 30 and bearing against the periphery of the base of the transmitter. Two short lengths of pipe 34 are welded at one of their ends to each other and are welded tangentially to the ring; the pipe sections are pre-shaped to form approximately an edge 36 where welded to each other. The two cable attachment 16 is secured near the edge 36. Also the pipe sections are bent or ground down angularly slightly so that the edge is somewhat off the ground as the leading end of a ski to facilitate sliding. A flat plate section 38 is welded to the bottom of the tubes and to the ring so that the structural framework 14 is rigid and sufficiently tough for the use described.

Figure 6:
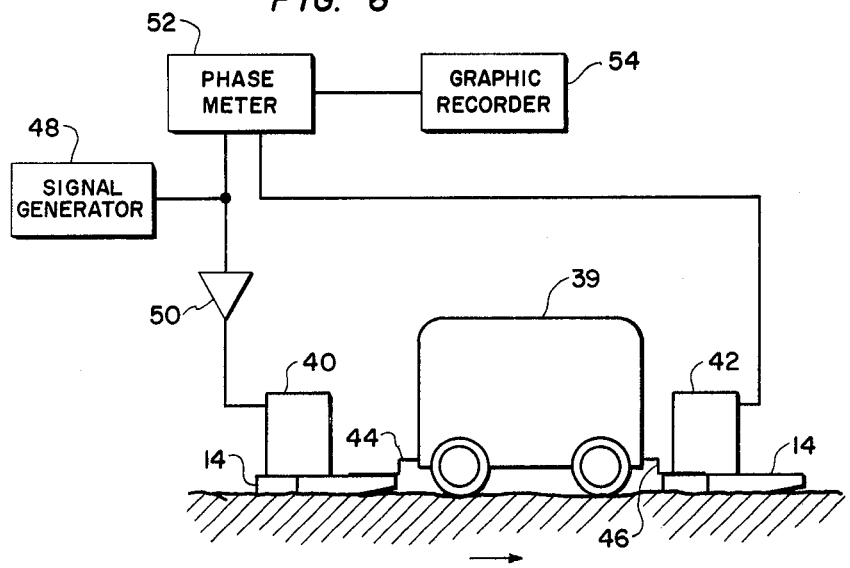
FIG. 6 is a vehicle mounted embodiment of the invention.

FIG. 6 shows an arrangement for practicing the invention by holding the length of scan path constant while displacing the scan path. A vehicle 39 supports a pair of electro-seismic transducers 40 and 42 spaced several meters apart. Supports 44, 46 for the transducers are adjustable to raise the transducers out of engagement with the ground surface or to lower the transducers to yieldably bear against the ground surface. Sufficient weight or spring urging may be added to force the transducers downwardly into firm contact with the ground where the ground surface is grass covered or for another reason requires additional downward force for improving the coupling. A signal generator 48, an amplifier 50, a phase meter 52 and a recorder 54 are coupled to the transducers as described previously. However the receiver as well as the transmitter is equipped with a structure 14 to facilitate sliding. The power amplifier is selected for much higher power output, e.g., 100 watts. The output circuit of the receiver includes a signal detection circuit for separating the signal from vehicle noise and from the noise generated by sliding the receiver as well as the transmitter. A selected zone can be scanned very rapidly using an equipment as in FIG. 6. The recorded curve will be substantially a straight line where the earth is homogeneous. The curve will deviate appreciably if a tunnel is encountered. Variations in coupling and inhomogeneties in the earth will cause smaller deviations.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A method of detecting a subsurface shallow depth excavation comprising:
   coupling very narrow-band, constant-phase, continuous wave vibration energy to the surface of the earth for a selected time period and sensing seismic energy of the same frequency at the surface, the coupling and the sensing being at locations spaced by several meters,
   continuously shifting at least one of the locations,
   continuously metering and visibly registering only the phase angle between vibration energy coupled into the earth and the sensed seismic energy of the same frequency.

2. A method of detecting a subsurface shallow depth excavation as defined in claim 1 which includes shifting the coupling location.

3. A method of detecting a subsurface shallow depth excavation as defined in claim 1 wherein said coupling to the earth and said sensing at the earth's surface is at a constant distance apart, and shifting the two locations in train.

4. Apparatus for use in detecting a subsurface shallow depth excavation comprising:
   a vehicle;
   a pair of very-low-frequency, very-narrow-band electroseismic transducers, tuned to essentially the same very narrow band, mounted on said vehicle several meters apart for firm sliding engagement with the earth's surface, for vibration energy transfer between the earth and each of said transducers,
   a signal generator and amplifier carried by said vehicle and coupled to one of said transducers,
   a phase metering means carried by said vehicle for providing continuously the phase angle difference between energy sensed by the other of said transducers and the energy at the input of said one of said transducers, and
   a recorder carried by said vehicle and coupled to the phase metering means for continuously registering the magnitude of phase angle difference provided by the phase metering means.

* * * * *